United States Patent
Pusalkar et al.

(10) Patent No.: US 10,911,402 B2
(45) Date of Patent: Feb. 2, 2021

(54) STORAGE SYSTEM WITH NETWORK-WIDE CONFIGURABLE DEVICE NAMES

(71) Applicant: EMC IP Holding Company LLC, Hopkinton, MA (US)

(72) Inventors: Maneesh Pusalkar, Pune (IN); Arieh Don, Newton, MA (US); Vinay Rao, Bangalore (IN); Yaron Dar, Sudbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/816,355

(22) Filed: Mar. 12, 2020

(65) Prior Publication Data

US 2020/0213274 A1    Jul. 2, 2020

Related U.S. Application Data

(63) Continuation of application No. 15/795,653, filed on Oct. 27, 2017, now Pat. No. 10,652,206.

(51) Int. Cl.
*G06F 15/16* (2006.01)
*H04L 29/12* (2006.01)
(Continued)

(52) U.S. Cl.
CPC ............ *H04L 61/30* (2013.01); *G06F 3/0605* (2013.01); *G06F 3/067* (2013.01); *H04L 67/1097* (2013.01)

(58) Field of Classification Search
CPC .... G06F 3/0604; G06F 3/0605; G06F 3/0659; G06F 3/067; H04L 61/2038; H04L 61/30; H04L 61/6045; H04L 67/1097
See application file for complete search history.

(56) References Cited

U.S. PATENT DOCUMENTS 6,567,397 B1    5/2003  Campana et al.
6,687,746 B1    2/2004  Shuster et al.
(Continued)

FOREIGN PATENT DOCUMENTS

CN    103677927 B    2/2017
EP    1117028 A2     7/2001
(Continued)

OTHER PUBLICATIONS

Kris Piepho, "Dell EMC SC Series Storage: Microsoft Multipath I/O," Dell EMC Best Practices, Jan. 2017, 57 pages.
(Continued)

*Primary Examiner* — Normin Abedin
(74) *Attorney, Agent, or Firm* — Ryan, Mason & Lewis, LLP

(57) ABSTRACT

A storage system in one embodiment comprises at least one storage array comprising a plurality of storage devices. The storage array is configured to communicate over one or more networks with a plurality of host devices. The storage array is further configured to receive one or more commands from a given one of the host devices directing that a particular user-defined name be assigned to a particular one of the storage devices, and responsive to receipt of the one or more commands, to determine if any other user-defined name is already assigned to the particular storage device, and if there is no other user-defined name already assigned to the particular storage device, to assign the particular user-defined name to the particular storage device and to store information characterizing the assignment of the particular user-defined name to the particular storage device in persistent memory of the storage array.

20 Claims, 2 Drawing Sheets

(51) Int. Cl.
*G06F 3/06* (2006.01)
*H04L 29/08* (2006.01)

(56) References Cited

U.S. PATENT DOCUMENTS

| | | |
|---|---|---|
| 6,697,875 B1 | 2/2004 | Wilson |
| 7,275,103 B1 | 9/2007 | Thrasher et al. |
| 7,454,437 B1 | 11/2008 | Lavallee et al. |
| 7,617,292 B2 | 11/2009 | Moore et al. |
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,400,611 B1 | 7/2016 | Raizen |
| 9,594,780 B1 | 3/2017 | Esposito et al. |
| 9,647,933 B1 | 5/2017 | Tawri et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,639 B2 | 12/2019 | Mallick et al. |
| 2002/0023151 A1 | 2/2002 | Lwatani |
| 2002/0103923 A1 | 8/2002 | Cherian et al. |
| 2004/0010563 A1* | 1/2004 | Forte ................ H04L 29/12009 709/215 |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salli |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2013/0117766 A1 | 5/2013 | Bax et al. |
| 2014/0105068 A1 | 4/2014 | Xu |
| 2015/0222705 A1 | 8/2015 | Stephens |
| 2015/0242134 A1 | 8/2015 | Takada et al. |
| 2016/0042194 A1* | 2/2016 | Chakraborty ......... G06F 3/0622 726/17 |
| 2016/0092136 A1 | 3/2016 | Balakrishnan et al. |
| 2016/0117113 A1* | 4/2016 | Li ........................... G06F 3/067 711/112 |
| 2016/0335003 A1 | 11/2016 | Ahmed et al. |
| 2017/0235507 A1 | 8/2017 | Sinha et al. |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |

OTHER PUBLICATIONS

NVM Express, "NVM Express, Revision 1.3," NVM Express, May 1, 2017, 282 pages.

Vmware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," EMC PowerMax Family Product Guide, May 2019, 192 pages.

Dell EMC, "Dell EMC SC Series Storage and Microsoft Multipath I/O," CML 1004, Jul. 2018, 36 pages.

Vmware, Inc. "VMware VMFS Volume Management," 2009, 8 pages.

Dell EMC, "Dell EMC Unity: Virtualization Integration," Technical White Paper, Oct. 2019, 39 pages.

U.S. Appl. No. 15/795,653 filed in the name of Maneesh Pusalkar et al. filed Oct. 27, 2017, and entitled "Storage System with Network-Wide Configurable Device Names."

U.S. Appl. No. 16/142,274 filed in the name of Sanjib Mallick et al. filed Sep. 26, 2018, and entitled "Host Device with Multi-Path Layer Implementing Automatic Standby Setting for Active-Active Configuration."

U.S. Appl. No. 16/145,502 filed in the name of Vinay G. Rao et al. filed Sep. 28, 2018, and entitled "Host Device with Multi-Path Layer Implementing Path Selection Based At Least in Part on Fabric Identifiers."

U.S. Appl. No. 16/155,429 filed in the name of Rimpesh Patel et al. filed Oct. 9, 2018, and entitled "Categorizing Host IO Load Pattern and Communicating Categorization to Storage System."

U.S. Appl. No. 16/155,491 filed in the name of Kundan Kumar et al. filed Oct. 9, 2018, and entitled "Migrating Control of a Multi-Path Logical Device from a Current MPIO Driver to a Target MPIO Driver."

U.S. Appl. No. 16/697,393 filed in the name of Vinay G. Rao et al. filed Nov. 27, 2019, and entitled "Automated Seamless Migration of Logical Storage Devices."

U.S. Appl. No. 16/710,828 filed in the name of Amit Pundalik Anchi et al. filed Dec. 11, 2019, and entitled "Automated Seamless Migration with Signature Issue Resolution."

* cited by examiner

STORAGE SYSTEM WITH NETWORK-WIDE CONFIGURABLE DEVICE NAMES

RELATED APPLICATION(S)

The present application is a continuation of U.S. patent application Ser. No. 15/795,653, filed Oct. 27, 2017, and entitled "Storage System with Network-Wide Configurable Device Names," which is incorporated by reference herein in its entirety.

FIELD

The field relates generally to information processing systems, and more particularly to storage in information processing systems.

BACKGROUND

A wide variety of different types of storage systems are known. For example, some storage systems are configured to include multiple storage tiers, with different ones of the tiers providing different levels of performance or other characteristics. In such storage systems, data may be moved from one tier to another within a given storage system based on access frequency of the data or other factors. These and other types of storage systems may be shared by multiple host devices of a compute cluster. However, problems can arise in such arrangements in that multi-path input-output (MPIO) drivers of respective host devices sharing the storage system over a storage area network (SAN) may automatically assign different pseudonames to the same storage device of the storage system.

SUMMARY

Illustrative embodiments of the present invention provide storage systems configured with functionality for network-wide configurable device names. These and other embodiments overcome the problems that can otherwise result when MPIO drivers of different host devices accessing a shared storage system over a SAN or other network automatically assign different pseudonames to the same storage device. Moreover, such embodiments are advantageously configured to allow users to assign user-friendly names or other types of user-defined names to particular storage devices in a manner that ensures that the assigned user-defined names are utilized consistently by all of the host devices sharing the storage devices of the storage system over a SAN or other network.

In one embodiment, a storage system comprises at least one storage array comprising a plurality of storage devices. The storage array is configured to communicate over one or more networks with a plurality of host devices. The storage array is further configured to receive one or more commands from a given one of the host devices directing that a particular user-defined name be assigned to a particular one of the storage devices, and responsive to receipt of the one or more commands, to determine if any other user-defined name is already assigned to the particular storage device, and if there is no other user-defined name already assigned to the particular storage device, to assign the particular user-defined name to the particular storage device and to store information characterizing the assignment of the particular user-defined name to the particular storage device in persistent memory of the storage array.

The plurality of storage devices of the storage array in some embodiments collectively comprise at least a portion of a SAN, and the particular user-defined name assigned to the particular storage device is utilized consistently SAN-wide by the plurality of host devices to identify the particular storage device within the SAN. The particular user-defined name is utilized instead of potentially-conflicting pseudonames automatically assigned by respective MPIO drivers of those host devices.

For example, the given host device may respond to acceptance of the one or more commands in the storage array by storing the particular user-defined name in association with a MPIO-assigned pseudoname of the particular storage device in persistent memory of the given host device, and utilizing the particular user-defined name instead of the pseudoname to identify the particular storage device.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
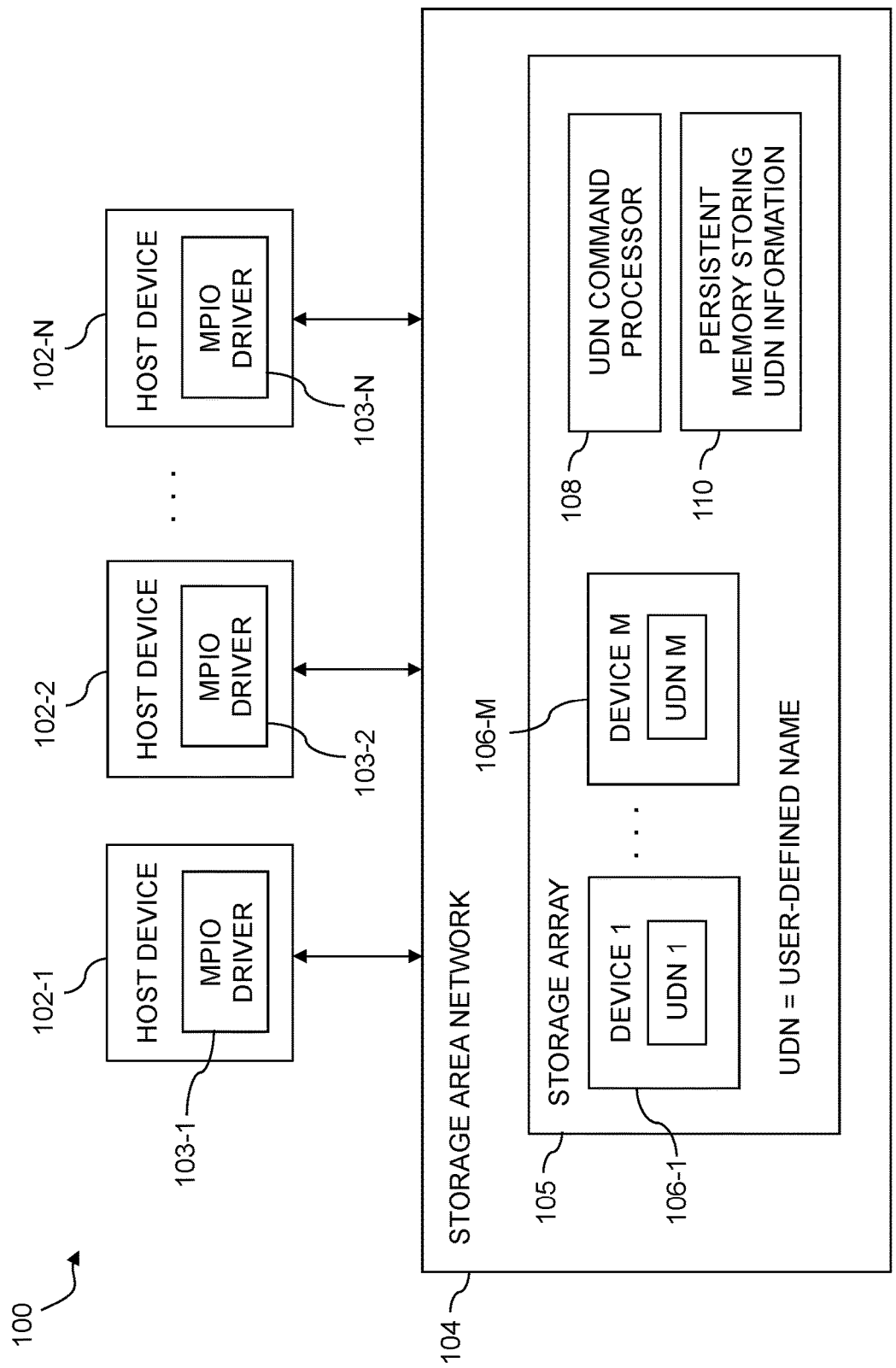
FIG. 1 is a block diagram of an information processing system comprising a storage system configured with functionality for network-wide configurable device names in an illustrative embodiment.

FIG. 1 shows an information processing system 100 configured in accordance with an illustrative embodiment. The information processing system 100 comprises a plurality of host devices 102-1, 102-2, . . . 102-N having respective multi-path input-output (MPIO) drivers 103-1, 103-2, . . . 103-N. The host devices 102 communicate over a storage area network (SAN) 104 with at least one storage array 105. The storage array 105 comprises a plurality of storage devices 106-1, . . . 106-M each having a corresponding user-defined name (UDN) assigned in the manner disclosed herein. The storage array 105 and its associated storage devices 106 are an example of what is more generally referred to herein as a "storage system." This storage system in the present embodiment is shared by the host devices 102, and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a platform-as-a-service (PaaS) model, although it is to be appreciated that numerous other cloud infrastructure arrangements could be used.

The MPIO drivers 103 are illustratively configured utilizing well-known MPIO functionality such as that described in K. Piepho, "Dell EMC SC Series Storage: Microsoft Multipath I/O," Dell EMC Engineering, June 2017, which is incorporated by reference herein. Such MPIO functionality is suitably modified herein to perform operations associated with assignment of network-wide configurable device names.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage array 105 in the present embodiment is configured to implement configurable device name functionality for the storage devices 106-1 through 106-M, which are also designated in the figure as Device 1 through Device M and have respective UDNs denoted UDN 1 through UDN M. More particularly, the storage array 105 is configured to permit user assignment of distinct user-friendly device names or other types of UDNs to respective ones of the storage devices 106. As will be described in more detail below, the particular UDNs assigned to the respective storage devices 106 are utilized consistently by the host devices 102 to identify those storage devices within the SAN 104.

The configurable device name functionality implemented in the storage array 105 is provided at least in part by a UDN command processor 108 and a persistent memory 110 that stores UDN information.

In operation, the UDN command processor 108 of the storage array 105 receives one or more commands from a given one of the host devices 102 directing that a particular UDN be assigned to a particular one of the storage devices 106. Responsive to receipt of the one or more commands, the UDN command processor 108 determines if any other UDN is already assigned to the particular storage device, and if there is no other UDN already assigned to the particular storage device, the UDN command processor 108 assigns the particular UDN to the particular storage device and stores information characterizing the assignment of the particular UDN to the particular storage device in the persistent memory 110 of the storage array 105.

The persistent memory 110 may comprise a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory 110 is illustratively shown in this embodiment as being separate from the storage devices 106 of the storage array 105, although in other embodiments the persistent memory 110 may be implemented as a designated portion or portions of one or more of the storage devices 106.

The one or more commands from a given one of the host devices 102 directing that a particular UDN be assigned to a particular one of the storage devices 106 are generated by the corresponding one of the MPIO drivers 103 in the given host device. In some embodiments, these commands comprise SCSI commands, although as noted above other types of commands can be used in other embodiments. For example, the one or more commands for assigning a particular UDN to a particular storage device can be generated in some embodiments through suitable modification of otherwise conventional command features and functionality associated with NVM Express (NVMe), as described in the NVMe Specification, Revision 1.3, May 2017, which is incorporated by reference herein.

The one or more commands utilized in a given embodiment can include commands that are part of a standard command set or may include custom commands such as a "vendor unique command" or VU command that is not part of a standard command set.

The particular UDN to be assigned to a particular one of the storage devices 106 may be provided by a user of the storage array 105 to a user-space portion of the MPIO driver of the given host device via a command line interface (CLI). Numerous other techniques can be used to allow a user to supply a particular UDN within one of the host devices 102 for assignment to a particular one of the storage devices 106.

In some embodiments, the one or more commands from a given one of the host devices 102 directing that a particular UDN be assigned to a particular one of the storage devices 106 are generated at least in part by at least one of a user-space portion of the MPIO driver of the given host device and a kernel-space portion of the MPIO driver of the given host device. For example, it is possible for the one or more commands to be generated solely in the user-space portion of the MPIO driver. Alternatively, the one or more commands can be generated by cooperative interaction between the user-space and kernel-space portions of the MPIO driver, or solely in the kernel-space portion of the MPIO driver.

The one or more commands illustratively comprise a first command configured to write metadata to the persistent memory 110 of the storage array 105. For example, the first command may comprise another UDN already assigned to the particular storage device, the particular UDN proposed for assignment to the particular storage device, a unique identifier generated by the given host device for the particular UDN, a host name of the given host device, and at least one embedded command. Various subsets of these information elements may be utilized in the first command in other embodiments.

The unique identifier that may be part of the first command described above illustratively comprises a random number generated by a random number generator in a kernel-space portion of the MPIO driver of the given host device.

The embedded command that may be part of the first command described above illustratively comprises at least one of a replace command, a lock command and a force command. The replace command directs the storage array 105 to replace any other UDN already assigned to the particular storage device with the particular UDN specified in the first command. The lock command directs the storage array 105 not to make any further change in the assignment of the particular UDN to the particular storage device absent receipt of a force command. The force command overrides a previously-received lock command for another UDN already assigned to the particular storage device.

The UDN command processor 108 of the storage array 105 may be further configured to receive one or more additional commands that are generated by the MPIO driver of the given host device in order to determine if any other UDN is assigned to the particular storage device before the MPIO driver generates the one or more commands directing that the particular UDN be assigned to the particular storage device. For example, the one or more additional commands may comprise a second command configured to read metadata from the persistent memory 110 of the storage array 105.

If the UDN command processor 108 of the storage array 105 determines that another UDN is already assigned to the particular storage device and the first command does not include a force command as an embedded command, it rejects the first command and leaves the UDN of the particular storage device unchanged.

The given host device may respond to such a rejection of the first command by reading the other UDN utilizing the second command, storing the other UDN in association with an MPIO pseudoname of the particular storage device in persistent memory of the given host device, and utilizing the other UDN instead of the pseudoname to identify the particular storage device within the SAN 104.

If no other UDN is already assigned to the particular storage device, or if another UDN is already assigned to the particular storage device and the first command includes a force command as an embedded command, the UDN command processor 108 of the storage array 105 is configured to accept the first command and to assign the particular UDN to the particular storage device. As mentioned previously, this also involves storing information characterizing the assignment of the particular UDN to the particular storage device in the persistent memory 110 of the storage array 105.

In some embodiments, the persistent memory 110 additionally stores one or more previously-assigned UDNs for each of the storage devices 106. For example, in conjunction with changing the UDN for a particular one of the storage devices 106 from a previous UDN to a current UDN responsive to one or more commands received from a given one of the host devices 102, the persistent memory 110 also stores the previous UDN as well as the current UDN. This helps to ensure that any of the host devices 102 that are still using the previous UDN will be able to transition over to use of the current UDN, for example, after a reboot operation is performed in such a host device.

The given host device responds to acceptance of the first command by storing the particular UDN in association with an MPIO pseudoname of the particular storage device in persistent memory of the given host device, and utilizing the particular UDN instead of the pseudoname to identify the particular storage device within the SAN 104.

Each of the other host devices 102 can similarly generate one or more commands via its corresponding MPIO driver directing that particular UDNs be assigned to respective particular ones of the storage devices 106.

The above-described arrangements ensure that all of the host devices 102 consistently utilize the particular UDNs assigned to the respective storage devices 106 throughout the SAN 104 regardless of the pseudonames that may have been automatically assigned by their corresponding MPIO drivers 103. This advantageously avoids the problems of conventional practice that would otherwise arise when the MPIO drivers 103 of the different host devices 102 accessing the shared storage array 105 over SAN 104 automatically assign different pseudonames to the same storage device.

The operations described above as being performed by the UDN command processor 108 in the present embodiment can alternatively be performed at least in part by one or more other components of the storage array 105, such as a storage controller, although that component is not explicitly illustrated in the figure. It is also possible that the UDN command processor 108 can be incorporated into a storage controller of the storage array. Other types of processing circuitry within the storage array 105 can be used to implement functionality for processing of commands for assigning UDNs to respective ones of the storage devices 106 and ensuring consistent usage of the assigned UDNs within the SAN 104 by all of the host devices 102 that share access to the storage array 105.

The host devices 102 are assumed to comprise respective command generators for generating the one or more commands for assigning particular UDNs to particular ones of the storage devices 106. Such command generators are illustratively implemented at least in part in the form of software executed by the respective host devices 102, although other arrangements are possible.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. The term "storage device" as used herein is intended to be broadly construed, so as to encompass, for example, disk drives, flash drives, solid-state drives, hybrid drives or other types of storage products and devices.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array suitably reconfigured to implement configurable device name functionality as disclosed herein.

For example, the storage array 105 may comprise one or more storage arrays such as VNX®, Symmetrix VMAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, MPIO drivers 103, SAN 104, storage array 105, storage devices 106, UDN command processor 108 and persistent memory 110 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 210, and is suitable for use in the system 100 but is more generally applicable to other types of systems comprising multiple host devices and a shared storage system. The shared storage system in this embodiment is assumed to comprise at least one storage array having a plurality of storage devices. The steps 200 through 210 in the present embodiment are illustratively performed primarily by the storage array, although other system components can perform at least portions of one or more of the steps in other embodiments. This embodiment further assumes that the commands utilized by the host devices to assign particular UDNs to particular storage devices of the storage array comprise SCSI commands, although other types of commands can be used.

In step 200, the storage array receives from an MPIO driver of a given host device a designated SCSI command that includes a proposed UDN for a particular storage device of the storage array. The proposed UDN may be entered by a user of the given host device via a CLI or other type of interface. As indicated previously, the designated SCSI command may be generated using one or both of a user-space portion and a kernel-space portion of the MPIO driver of the given host device.

As a more particular example, the designated SCSI command illustratively comprises an SCSI log select command configured to write metadata to a persistent memory of the storage array. Other types of VU commands or other user-defined SCSI commands or non-SCSI commands can be used in other embodiments.

The designated SCSI command is illustratively configured to include another UDN already assigned to the particular storage device, if there is such a previously-assigned UDN for the particular storage device, as well as the particular UDN proposed for assignment to the particular storage device. The designated SCSI command can additionally include a unique identifier generated by the given host device for the particular UDN, a host name of the given host device and possibly at least one embedded command. The unique identifier may comprise a random number generated by a random number generator in a kernel-space portion of the MPIO driver of the given host device.

Examples of embedded commands include a replace command that directs the storage array to replace any other UDN already assigned to the particular storage device with the particular UDN, a lock command that directs the storage array not to make any further change in the assignment of the particular UDN to the particular storage device absent receipt of a force command, and a force command that overrides a previously-received lock command for another UDN already assigned to the particular storage device.

Again, these particular command format features are examples only, and numerous other SCSI or non-SCSI command formats may be used in other embodiments, including VU commands or other user-defined commands.

Figure 2:
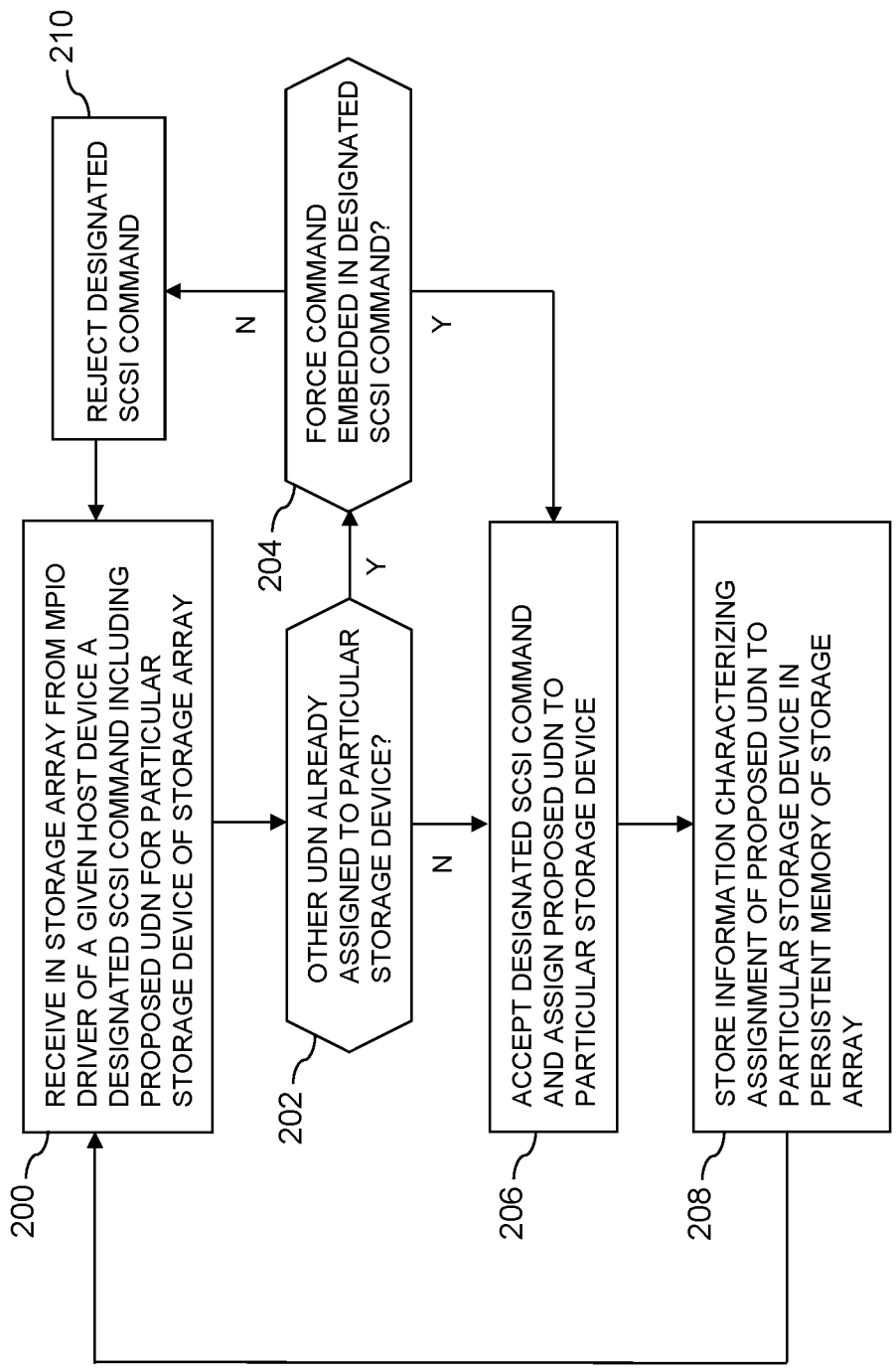
FIG. 2 is a flow diagram of a process for implementing network-wide configurable device names in the information processing system of FIG. 1.

Although not shown in the FIG. 2 flow diagram, an additional designated SCSI command may be generated by the MPIO driver of the given host device and sent to the storage array in order to allow the given host device to determine if any other UDN is assigned to the particular storage device before it generates the designated SCSI command directing that the particular UDN be assigned to the particular storage device. The additional designated SCSI command may comprise an SCSI log sense command configured to read metadata from the persistent memory of the storage array.

In step 202, a determination is made as to whether or not another UDN is already assigned to particular storage device. If another UDN is already assigned to the particular storage device, the process moves to step 204, and otherwise moves to step 206.

In step 204, a determination is made as to whether or not a force command is embedded in the designated SCSI command. If a force command is embedded in the designated SCSI command, the process moves to step 206, and otherwise moves to step 210.

In step 206, the storage array accepts the designated SCSI command and assigns the proposed UDN to the particular storage device. Accordingly, if no other UDN is already assigned to the particular storage device, or if another UDN is already assigned to the particular storage device and the designated SCSI command includes a force command as an embedded command, the storage array is configured to accept the designated SCSI command and to assign the particular UDN to the particular storage device.

In step 208, the storage array stores information characterizing assignment of the proposed UDN to the particular storage device in a persistent memory of storage array. The storage array also continues to store in the persistent memory the previously-assigned UDN for the particular storage device, if there is such a previously-assigned UDN. The persistent memory therefore stores the previous UDN as well as the current UDN for the particular storage device. This helps to ensure that any of the host devices that are still using the previous UDN will be able to transition over to use of the current UDN, for example, after a reboot operation is performed in such a host device.

The given host device illustratively responds to acceptance of the designated SCSI command by storing the particular UDN in association with an MPIO pseudoname of the particular storage device in the persistent memory of the given host device, and utilizing the particular UDN instead of the pseudoname to identify the particular storage device.

In step 210, which is performed if there is already another UDN assigned to the particular storage device and there is no force command embedded in the designated SCSI command, the storage array rejects the designated SCSI command and leaves the UDN of the particular storage device unchanged.

The given host device illustratively responds to rejection of the designated SCSI command by reading the other UDN utilizing an additional designated SCSI command, storing the other UDN in association with an MPIO pseudoname of the particular storage device in persistent memory of the given host device, and utilizing the other UDN instead of the pseudoname to identify the particular storage device.

After completion of step 208 or step 210 for a designated SCSI command that includes a proposed UDN for a particular storage device of the storage array, the FIG. 2 process then returns to step 200 as shown in order to process additional designated SCSI commands that include proposed UDNs for particular storage devices of the storage array. For example, the FIG. 2 process may be iterated to allow different users associated with different host devices to assign different UDNs to different storage devices of the storage array.

It is to be appreciated that the FIG. 2 process can be adapted for use with other types of information systems, including by way of example an information processing system in which multiple host devices and a shared storage system are all implemented on the same processing platform.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and configurable device name functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different configurable device name arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

An additional example of an illustrative embodiment implemented using the FIG. 2 process for assigning UDNs to storage devices of a storage array will now be described. In this embodiment, it is assumed that the MPIO drivers of the respective host devices automatically assign pseudonames to storage devices in accordance with a particular algorithm that does not necessarily produce the same pseudoname for the same storage device on different hosts. This creates problems for distributed applications operating across multiple ones of the host devices as such applications require that a given storage resource have a consistent name across all of those host devices.

In this example, a user creates a file on a given one of the host devices that includes user-friendly names or other UDNs for different ones of a plurality of storage devices of a storage array in a shared storage system. Alternatively, the user can enter the UDNs directly using one or more CLIs or other interfaces of the given host device. The UDNs may include useful information about the storage device usage (e.g., Oracle_Marketing_log). The UDNs are provided via files, CLIs or other interfaces to a user-space portion of the MPIO driver on the given host device. The user-space portion of the MPIO driver passes the UDNs to a kernel-space portion of the MPIO driver. The kernel-space portion of the MPIO driver includes a random number generator configured to produce unique identifiers that are associated by the MPIO driver with respective ones of the UDNs.

For a given such UDN, the kernel-space portion of the MPIO driver may first generate a SCSI log sense command to determine if another UDN has already been assigned to the particular storage device. If there is no such previously-assigned UDN for the particular storage device, the kernel-space portion of the MPIO driver generates a SCSI log select command to assign the proposed UDN to the particular storage device. In other embodiments, these operations can be performed by a user-space portion of the MPIO driver, or by cooperative interaction between the user-space and kernel-space portions of the MPIO driver. The SCSI log select command illustratively includes the previous UDN if any, the proposed UDN, the unique identifier, the host name and possibly one or more embedded commands of the type described elsewhere herein, such as replace, lock or force commands. The host name may be the IP address of the host device or any other unique string.

If the particular storage device already has an assigned UDN and there is no force command embedded in the SCSI log select command, the storage array will reject the SCSI log select command containing the proposed UDN. The MPIO driver in the given host device responds to this rejection of the proposed UDN by generating an SCSI log sense command to read the assigned UDN from the storage array and will use that assigned UDN to refer to the particular storage device within the SAN.

Assume with reference to FIG. 1 that the particular storage device already has an assigned UDN given by ORACLE_LOG_1 and the particular storage device is mounted on multiple host devices such as host devices 102-1 through 102-N. Each such host device will store the current UDN in persistent memory on that host device. Further assume that a user on a particular host device such as host device 102-1 wants to change the UDN to ORACLE_LOG_2. This user enters a CLI command to direct the MPIO driver 103-1 to send an SCSI log select command with the current UDN ("ORACLE_LOG_1"), the proposed UDN ("ORACLE_LOG_2"), the unique identifier for the proposed UDN, the host name and at least a replace command. If the previous UDN was assigned using a lock command, the SCSI log select command should also include a force command.

After receiving the SCSI log select command, the storage array will update the current UDN to the proposed UDN in its persistent memory. As indicated previously herein, the storage array will generally maintain both the previous UDN and the updated current UDN in its persistent memory.

The host devices can be configured to periodically read the current UDNs for the respective storage devices from the storage array using SCSI log sense commands.

In some embodiments, the UDN for a particular storage device cannot be changed while that storage device is in use by one or more host devices. The above-noted periodic read of the current UDN can be used to keep each of the host devices informed regarding updates to the UDN made by other ones of the host devices.

The MPIO driver of a given host device is illustratively configured to determine if any persistent data from a particular storage device associated with a proposed UDN update is present on that host device. If such persistent data is present on the given host device, the MPIO driver will verify that the current UDN stored in persistent memory of the given host device is the same as the current UDN in the proposed UDN update. If both current UDNs are the same, the MPIO driver will replace the current UDN with the proposed UDN in the persistent memory of the given host device. If the persistent memory of the given host device does not include a current UDN for the particular storage device, the MPIO driver of the given host device will always adopt the proposed UDN.

Again, it is to be appreciated that the particular command fields, configurations and formats described above are presented by way of illustrative example only. Numerous alternative command arrangements can be used in implementing the FIG. 2 process and other illustrative embodiments.

Illustrative embodiments disclosed herein can provide a number of significant advantages relative to conventional arrangements.

For example, one or more embodiments provide storage systems configured with functionality for network-wide configurable device names. These and other embodiments overcome the problems that can otherwise result when MPIO drivers of different host devices accessing a shared storage system over a SAN or other network automatically assign different pseudonames to the same storage device.

Some embodiments are advantageously configured to allow users to assign user-friendly names or other types of UDNs to particular storage devices in a manner that ensures that the assigned UDNs are utilized consistently by all of the host devices sharing the storage devices of the storage system over a SAN or other network.

Illustrative embodiments therefore provide a convenient and efficient way to create user-friendly device names or other UDNs for respective storage devices of a storage array shared by multiple host devices, in a manner that ensures that such UDNs are utilized consistently across all of the host devices.

In addition, mechanisms for allowing the host devices to query the storage array for such UDNs are provided. The UDNs are illustratively stored in persistent memory on both the storage arrays and the host devices.

One or more embodiments are advantageously configured to allow storage administrators that are focused on the storage array and host administrators that are focused on the host devices to share a common language regarding consistent UDNs assigned to respective ones of the storage devices.

For example, the storage administrator can easily determine by reference to the persistent memory of the storage array the particular UDNs that are utilized by the host devices to refer to the storage devices.

Also, all of the host devices will automatically utilize a consistent UDN to refer to a given storage device of the storage array, which avoids the need for the host administrator to inform each host device running a distributed application of the nomenclature being used to identify a particular storage device. Illustrative embodiments can therefore provide significant enhancements in the orchestration of distributed applications in clustered processing systems.

Some embodiments utilize suitably-modified existing SCSI commands or other standard command formats to implement the configurable device name functionality. Numerous alternative VU commands or other types of user-defined commands can be used. This facilitates the implementation of the configurable device name functionality in a wide variety of different types of shared storage systems.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, UDN command processor 108 may be implemented at least in part in software, as indicated previously herein.

It should again be emphasized that the above-described embodiments of the invention are presented for purposes of illustration only. Many variations and other alternative embodiments may be used. For example, the disclosed techniques are applicable to a wide variety of other types of information processing systems, utilizing other arrangements of host devices, networks, storage systems, storage arrays, processors, memories, controllers, switches, storage devices and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   at least one processing device comprising a processor coupled to a memory;
   said at least one processing device being configured:
   to assign in a storage array a user-defined device name to a particular one of a plurality of storage devices of the storage array; and
   to store information characterizing the assignment of the particular user-defined name to the particular storage device in persistent memory of the storage array;
   wherein the user-defined device name is assigned to the particular storage device responsive to a request from a host device to assign the user-defined device name to that storage device; and
   wherein assigning the user-defined device name to the particular storage device comprises assigning the user-defined device name responsive to a determination by the storage array that the request includes a force command.

2. The apparatus of claim 1 wherein said at least one processing device is implemented in the storage array.

3. The apparatus of claim 1 wherein the storage array is configured to communicate with the host device and one or more additional host devices over a network.

4. The apparatus of claim 3 wherein the particular user-defined name assigned to the particular storage device is utilized consistently by the host devices to identify the particular storage device within a storage-area network that includes the storage array.

5. The apparatus of claim 3 wherein said at least one processing device is further configured to provide from the storage array to another one of the host devices the user-defined device name for the particular storage device.

6. The apparatus of claim 1 wherein the persistent memory comprises a non-volatile electronic memory of the storage array.

7. The apparatus of claim 1 wherein assigning the user-defined device name to the particular storage device comprises assigning the user-defined device name responsive to a determination by the storage array that no other user-defined name is already assigned by the storage array to the particular storage device.

8. The apparatus of claim 1 wherein the request comprises one or more commands received by the storage array from the host device over a network.

9. The apparatus of claim 1 wherein the request comprises at least a subset of:
   another user-defined name already assigned to the particular storage device;
   the particular user-defined name proposed for assignment to the particular storage device;
   a unique identifier generated by the host device for the particular user-defined name;
   a host name of the host device; and
   at least one embedded command.

10. The apparatus of claim 1 wherein the request comprises a replace command, the replace command directing the storage array to replace any other user-defined name already assigned to the particular storage device with the particular user-defined name.

11. The apparatus of claim 1 wherein the request comprises a lock command, the lock command directing the storage array not to make any further change in the assignment of the particular user-defined name to the particular storage device absent receipt of another force command.

12. The apparatus of claim 1 wherein the force command overrides a previously-received lock command for another user-defined name already assigned to the particular storage device.

13. The apparatus of claim 1 wherein the request is received in the storage array from a multi-path input-output driver of the host device.

14. A method comprising:
   assigning in a storage array a user-defined device name to a particular one of a plurality of storage devices of the storage array; and
   storing information characterizing the assignment of the particular user-defined name to the particular storage device in persistent memory of the storage array;
   wherein the user-defined device name is assigned to the particular storage device responsive to a request from a host device to assign the user-defined device name to that storage device;
   wherein assigning the user-defined device name to the particular storage device comprises assigning the user-defined device name responsive to a determination by the storage array that the request includes a force command; and wherein the method is performed by at least one processing device comprising a processor coupled to a memory.

15. The method of claim 14 wherein assigning the user-defined device name to the particular storage device comprises assigning the user-defined device name responsive to a determination by the storage array that no other user-defined name is already assigned by the storage array to the particular storage device.

16. A computer program product comprising a non-transitory processor-readable storage medium having stored therein program code of one or more software programs, wherein the program code, when executed by at least one processing device comprising a processor coupled to a memory, causes said at least one processing device:
to assign in a storage array a user-defined device name to a particular one of a plurality of storage devices of the storage array; and
to store information characterizing the assignment of the particular user-defined name to the particular storage device in persistent memory of the storage array;
wherein the user-defined device name is assigned to the particular storage device responsive to a request from a host device to assign the user-defined device name to that storage device; and
wherein assigning the user-defined device name to the particular storage device comprises assigning the user-defined device name responsive to a determination by the storage array that the request includes a force command.

17. The computer program product of claim 16 wherein assigning the user-defined device name to the particular storage device comprises assigning the user-defined device name responsive to a determination by the storage array that no other user-defined name is already assigned by the storage array to the particular storage device.

18. The computer program product of claim 16 wherein the request comprises a replace command, the replace command directing the storage array to replace any other user-defined name already assigned to the particular storage device with the particular user-defined name.

19. The computer program product of claim 16 wherein the request comprises a lock command, the lock command directing the storage array not to make any further change in the assignment of the particular user-defined name to the particular storage device absent receipt of another force command.

20. The computer program product of claim 16 wherein the force command overrides a previously-received lock command for another user-defined name already assigned to the particular storage device.

* * * * *